United States Patent [19]

Takahashi et al.

[11] Patent Number: 5,754,685
[45] Date of Patent: May 19, 1998

[54] IMAGE PROCESSING APPARATUS WITH BLANK CHARACTER AND LINE SPACE RECOGNITION CAPABILITIES

[75] Inventors: Kinya Takahashi, Yokohama; Masayuki Kiriyama, Tokyo, both of Japan

[73] Assignee: Canon Kabushiki Kaisha, Tokyo, Japan

[21] Appl. No.: 401,336

[22] Filed: Mar. 9, 1995

Related U.S. Application Data

[63] Continuation of Ser. No. 110,817, Aug. 23, 1993, abandoned, which is a continuation of Ser. No. 698,112, May 10, 1991, abandoned.

[30] Foreign Application Priority Data

May 15, 1990 [JP] Japan ................................ 2-125931
May 15, 1990 [JP] Japan ................................ 2-125932

[51] Int. Cl.$^6$ ........................................................ G06K 9/00
[52] U.S. Cl. ........................... 382/181; 382/171; 382/173; 395/780
[58] Field of Search ............................. 382/173, 282, 382/171, 181; 395/148, 600, 145, 780; 364/421, 920; 400/61; 345/141

[56] References Cited

U.S. PATENT DOCUMENTS

| | | | |
|---|---|---|---|
| 3,618,032 | 11/1971 | Goldsberry | 395/148 |
| 4,190,835 | 2/1980 | Buynak | 345/192 |
| 4,671,683 | 6/1987 | Ueno et al. | 400/61 |
| 4,772,883 | 9/1988 | Kitano | 345/141 |
| 4,916,740 | 4/1990 | Noda et al. | 382/282 |
| 5,003,614 | 3/1991 | Tanaka et al. | 382/48 |
| 5,003,616 | 3/1991 | Orita et al. | 382/282 |
| 5,033,008 | 7/1991 | Barker et al. | 395/148 |
| 5,093,868 | 3/1992 | Tanaka et al. | 382/48 |

FOREIGN PATENT DOCUMENTS

| | | | |
|---|---|---|---|
| 60-163171 | 8/1985 | Japan | G06F 15/64 |
| 1302483 | 12/1989 | Japan | G06K 9/62 |
| 3-25692 | 2/1991 | Japan | G06K 9/62 |

*Primary Examiner*—Jose L. Couso
*Assistant Examiner*—Anh Hong Do
*Attorney, Agent, or Firm*—Fitzpatrick, Cella, Harper & Scinto

[57] ABSTRACT

An image processing apparatus comprises: a blank discriminating circuit to discriminate a blank from image information; a line discriminating circuit to discriminate line information from information of the discriminated blank; and a paragraph recognizing circuit to recognize paragraph information from the discriminated blank information and the discriminated line information. The apparatus recognizes not only character but also blanks from the input image information and generates a result in a desired form.

18 Claims, 6 Drawing Sheets

IMAGE PROCESSING APPARATUS WITH BLANK CHARACTER AND LINE SPACE RECOGNITION CAPABILITIES

This application is a continuation of application Ser. No. 08/110,817 filed Aug. 23, 1993, now abandoned, which was a continuation of application Ser. No. 07/698,112 filed May 10, 1991, now abandoned.

BACKGROUND OF THE INVENTION

1. Field of the Invention

The invention relates to an image processing apparatus and, more particularly, to a technique in which not only characters but also blanks are recognized from input image information and the result of the recognition is generated in a desired format.

2. Related Background Art

A need for electrically converting news in a newspaper, a book, or the like, for filing or storing as a data base and for enabling such data to be efficiently used is rapidly increasing. Character recognizing apparatuses which can input a printed document at high speed and high accuracy are quickly being developed.

One such character recognizing apparatus is an OCR (optical character reading apparatus).

Hitherto, for instance, an output form of a document recognized by the OCR is fixed and the user cannot designate the output form. That is, either one of the modes to display only character codes by ignoring a style of a desired document and the mode to generate blank and return codes in accordance with the style of a desired document has been predetermined. On the other hand, a paragraph cannot be recognized at a high accuracy.

However, the above conventional apparatus has the following drawbacks because the user cannot change the output form.

(1) In the case of generating only character codes, blank and return codes are newly input in accordance with a desired document form after completion of the recognition.

(2) If both of the blank and the paragraph are recognized from the beginning and are displayed by a display section, a problem of delay when recognition occurs.

That is, there is a problem of delay to obtain a desired document so long as the output form cannot be designated.

(3) Even in the case of recognizing a paragraph, there is a problem such that the paragraph cannot be recognized at a high precision.

SUMMARY OF THE INVENTION

According to the present invention, by providing instructing means for designating a desired output form, memory means for storing character information, control means for controlling outputs of a blank, a return, a paragraph, or the like, and recognizing means for executing a discriminating process of a character, the character can be recognized and generated in accordance with a recognition mode designated by the user.

According to the present invention, a paragraph can be recognized at a high accuracy on the basis of intervals between character lines, a blank of a head portion of a character line, or a position of the last character of the character line.

DETAILED DESCRIPTION OF THE PREFERRED EMBODIMENT

An embodiment of the invention will be described in detail hereinbelow. The invention can be applied to a character recognizing apparatus or to a character processing apparatus having a character recognizing apparatus. The invention can be applied to an apparatus comprising one equipment or to a system comprising plurality of equipment.

Figure 1:
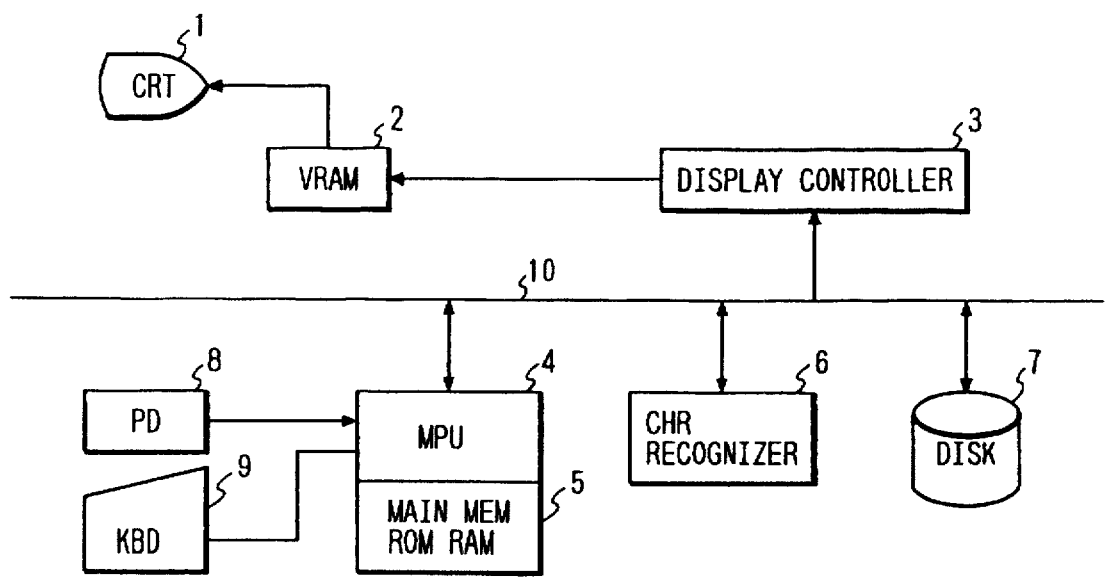
FIG. 1 is a block diagram showing an embodiment of the invention.

FIG. 1 is a block diagram of a character recognizing apparatus showing an embodiment of the invention. Reference numeral 1 denotes a CRT display section for displaying document image data by raster scanning; video RAM 2 (VRAM) stores pattern development information of one screen of the CRT display section 1; display controller 3 controls the development of the pattern into VRAM 2 and the pattern reading to CRT display section 1; microprocessor 4 (MPU) integratedly controls the respective sections; main memory 5 comprising a ROM which has therein a control program and a RAM which serves as a work memory for data processes; a character recognizer 6 matches a character image and a pattern and generates a character code; external magnetic disk device 7 stores the result of the discrimination and a candidate character pointing device 8 (PD) also serves as an indicating means for the invention and designates an arbitrary position on the CRT display section 1; keyboard 9; and I/O bus 10 for connects each block with MPU 4.

In the block diagram of FIG. 1, and explanation has been made with respect to the character recognizing apparatus. However, a recognizing function can be also added to a character processing apparatus as mentioned above. In such a case, a document processing program is also stored in the ROM. MPU 4 is also provided in character recognizer 6 and the processes are executed in parallel with the document processing control by MPU 4.

When an icon to execute the recognizing process is displayed on the screen during the document edition and the icon is designated by pointing device 8 (PD) or the like, the recognizing process is started and a menu to select, for instance, an output form of the result of the recognition is displayed. Or, when an icon to input an image from a scanner is designated, a menu as shown in FIG. 2 can be also automatically displayed.

Figure 2:
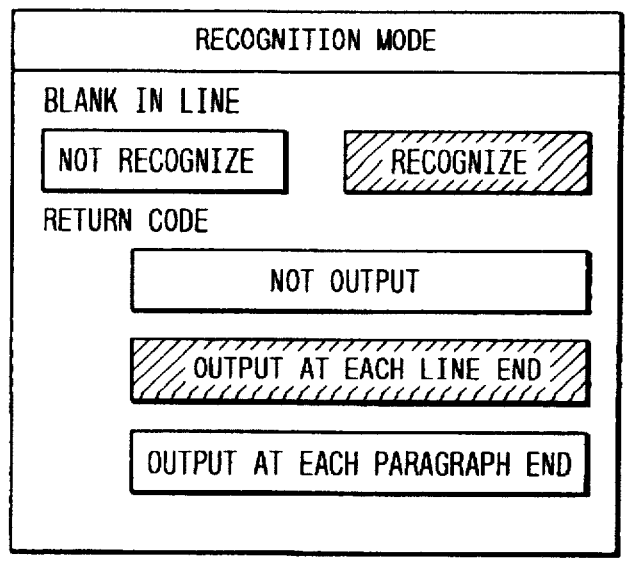
FIG. 2 is an explanatory diagram of a recognition mode selecting screen.

FIG. 2 shows a menu screen which has been displayed on CRT display section 1 and is used to arbitrarily select the output form. Through the menu screen, the user can designate a desired mode by using PD 8 or KBD 9 and can arbitrarily designate an output form.

As a result of the recognition, MPU 4 makes a character train of a form according to the output mode designated from the output data of the character recognizing apparatus.

Figure 3A:
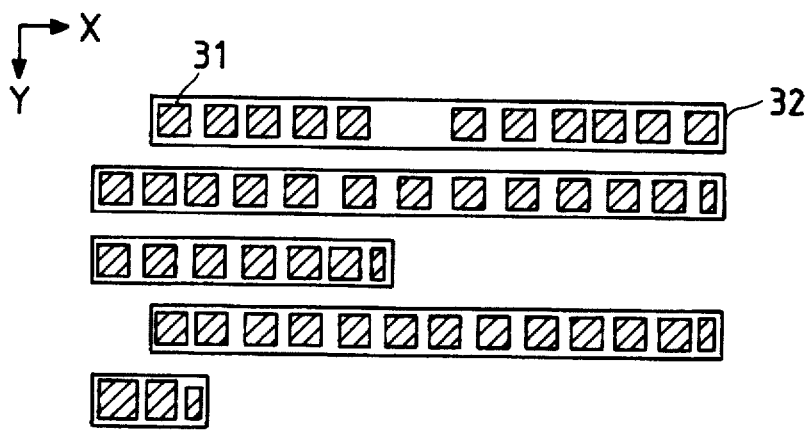
FIGS. 3A and 3B are diagrams showing an example of a document image.

FIG. 3A is a diagram schematically showing an example of a document image. Rectangle 31 which is shown as a hatched portion denotes a circumscribed rectangle of each character. Reference numeral 32 denotes a rectangle of a character line.

Figure 3B:
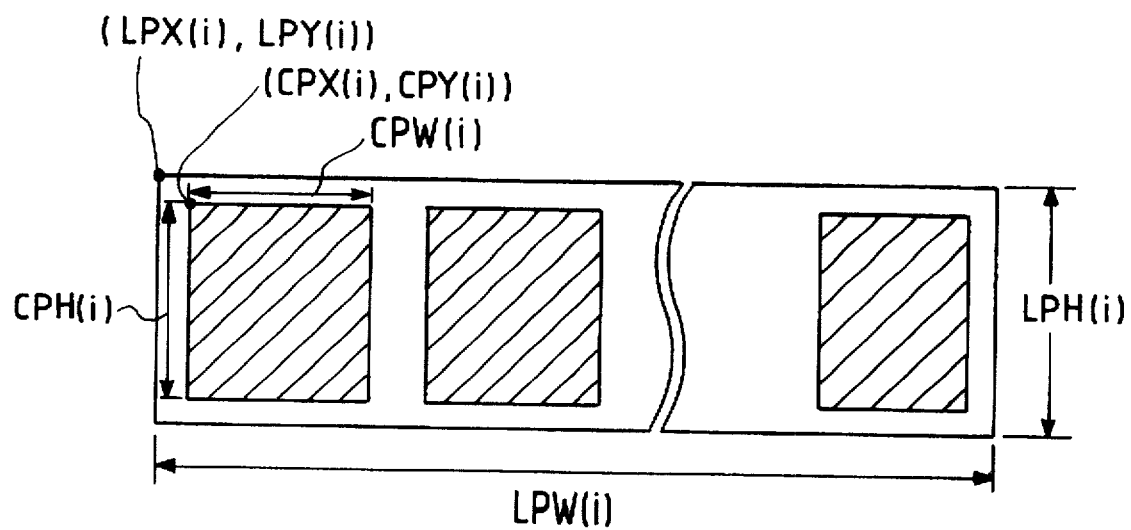

MPU 4 in the recognizer 6 obtains a circumscribed rectangle of each character as shown at 31 in FIG. 3A from the document image by a cutting-out process of a character. Subsequently, the character image is recognized and a character code is obtained as a result of the recognition. Information indicating the character code of each character and the position of the circumscribed rectangle are stored into memory 5 of the apparatus as information as shown in FIG. 3B.

In the character cutting-out process which is executed in recognizer 6, a frequency distribution in the character line direction is first obtained with respect to the input document image and the position of the character line is detected. Subsequently, by obtaining the character line and the frequency distribution in the vertical direction in the image of the character line portion, the left and right edges of each character existing in the character line are detected. Therefore, the first and last characters on each line of a document as an object of the character recognition are discriminated by recognizer 6, so that the information regarding the first and last characters are also stored into the RAM of memory 5.

Figure 4:
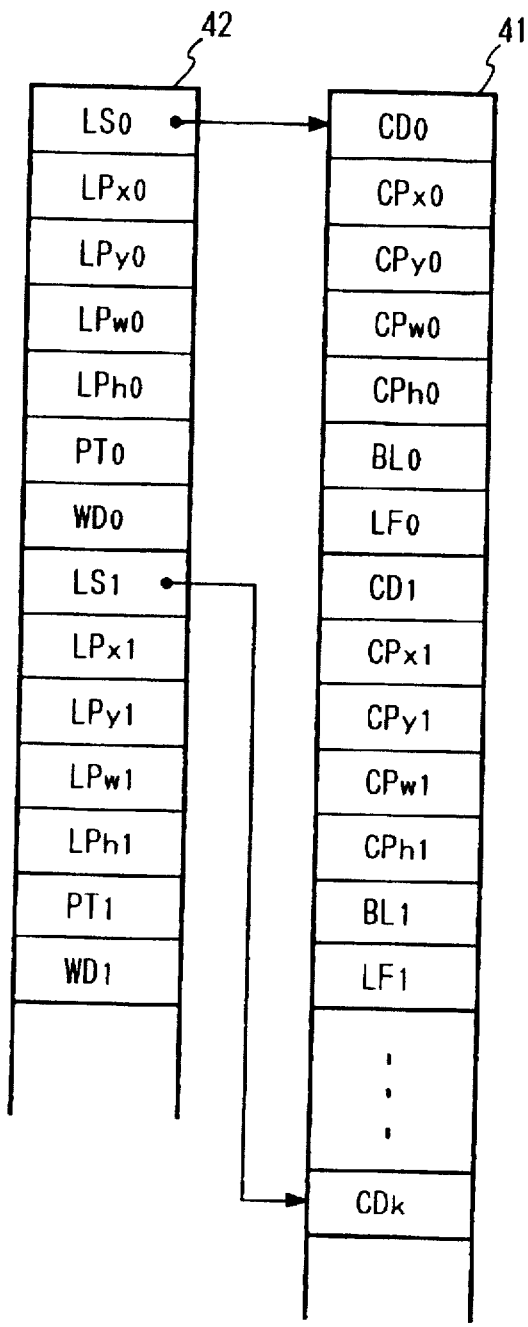
FIG. 4 is a diagram showing main data areas.

FIG. 4 is a diagram showing an example of main data format in the RAM of memory 5 of the apparatus.

Seven information for each character have been stored in character information storage area 41 in accordance with the appearance order of the characters. CD(i) (0≦i<the total number of characters) indicates a character code obtained by recognizer 6. On the other hand, as shown in FIG. 3B, CPX(i), CPY(i), CPW(i), and CPH(i) denote circumscribed rectangles; CPX(i) and CPY(i) indicate X and Y coordinates of the left upper edge of the circumscribed rectangle; and CPW(i) and CPH(i) represent a width and a height, respectively. BL(i) denotes the number of blank characters which are insertable just before the character. LF(i) indicates the number of return characters which are inserted just after the character as a delimiter of the paragraph. Initial values of BL(i) and LF(i) are set to 0 and values are properly stored therein by processes, which will be explained hereinafter. Values are stored into fields other than BL(i) and LF(i) by the character recognizing apparatus.

Information regarding each character line is stored into character line information storage area 42 in accordance with the appearance order of the character lines. An address for the first character in the character information storage area for the characters included in the character line has been stored in LS(i). As shown in FIG. 3B, LPX(j), LPY(j), LPW(j), and LPH(j) denote rectangles of a character line and indicate the minimum rectangles incorporating all of the characters included in the character line. PT(j) denotes a character pitch of a character train constructing the character line. A mean value is obtained from the character positions and stored into PT(j). Similarly, WD(j) denotes a mean character width of the character line.

Figure 5:
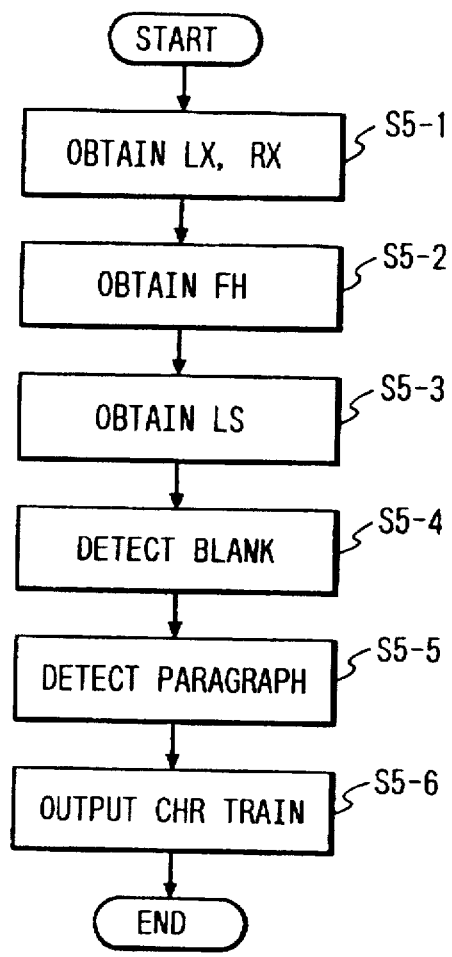
FIG. 5 is a flowchart of a recognition result outputting section.

FIG. 5 is a flowchart for outputting the result of the recognition. Such an outputting process is executed in accordance with the program in the ROM 5 under the control of MPU 4.

First, in step S5-1 of detecting the right and left edges of a document, an X coordinate LX of the left edge and an X coordinates RX of the right edge of a target document image (for instance, refer to FIG. 7) are obtained. The left edge coordinate LX is obtained as a minimum value of the left edges LPX(j) (0≦j<NL) (NL denotes the number of character lines) of the character line rectangles in character line information storage area 42. Similarly, the right edge coordinate RX is obtained as a maximum value of the right edge coordinates LPX(j)+LPW(j) of the character lines. The left edge coordinate LX and the right edge coordinate RX of the document obtained are stored in the RAM of memory 5.

Figure 7:
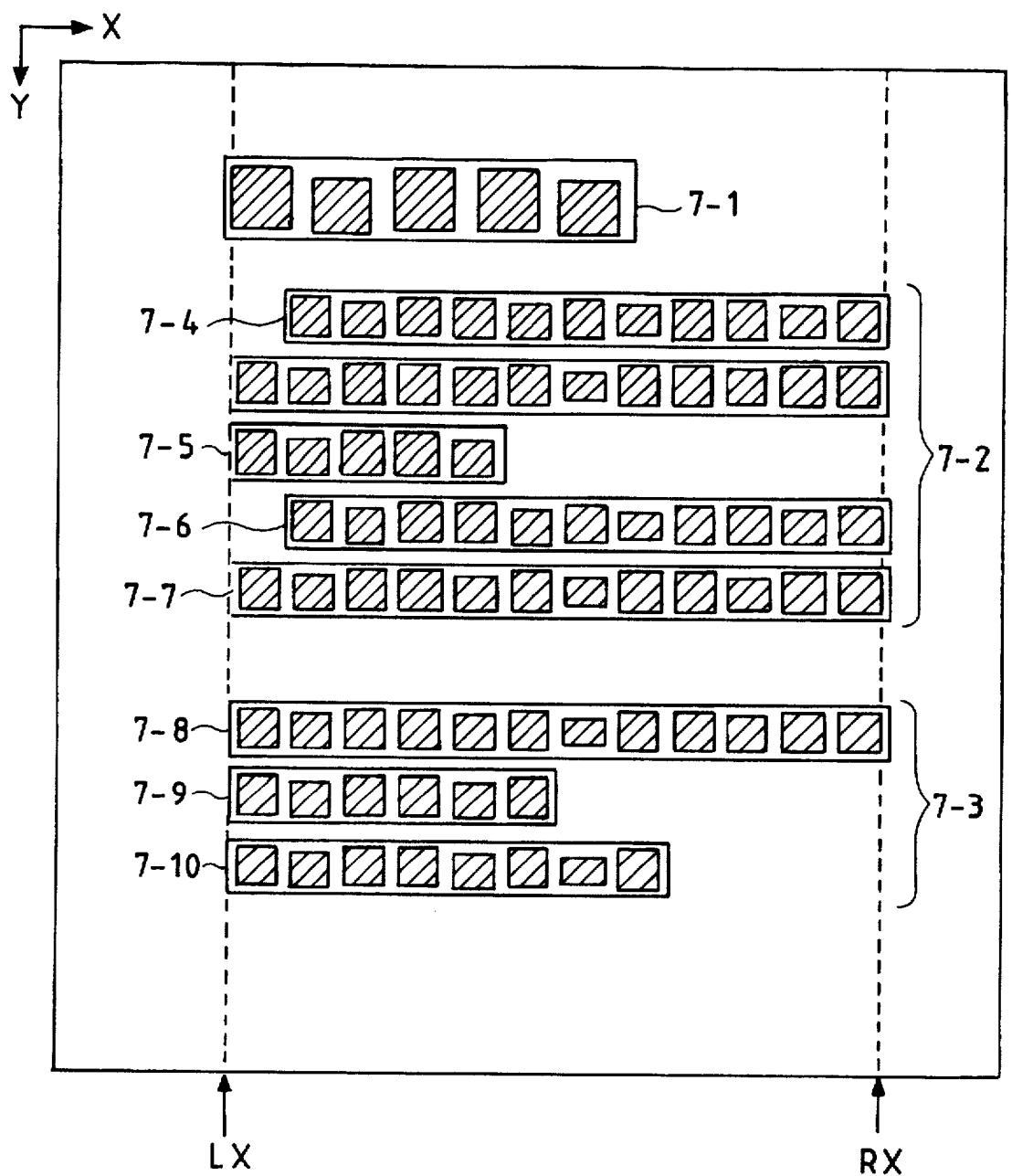
FIG. 7 is a diagram showing an example of a document image.

In a character height detecting step S5-2, a character height FH of the portion corresponding to a body in the document is obtained. To eliminate the character lines other than the body, a portion in which the character line rectangles having the same height as that of the preceding line most frequently continuously appear is extracted and a mean value of the heights of them is calculated and set as a character height FH. A discrimination regarding whether the adjacent character lines have the same height or not is performed as follows.

$$1-\alpha < LPH(j-1)/LPH(j) < 1+\alpha$$

where, $1 \leq j < NL$ ... equation S5-2-1 $\alpha$ is a constant to absorb errors and is set to, e.g., 0.2. Consequently, a head portion 7-1 in FIG. 7 is eliminated.

In step S5-3 of detecting intervals between character lines, an interval LS between character lines of the portion corresponding to the body is obtained. In a manner similar to the character height detecting section, a portion in which the same space between character lines as the space between preceding character lines more frequently continuously appears is extracted and a mean value of them is calculated and is set to an interval LS between character lines. A discrimination regarding whether the adjacent intervals between the character lines are the same or not is performed as follows.

$$1-\alpha < \frac{\{LPY(j+1)-(LPY(j)+LPH(j))\}}{\{LPY(j)-(LPY(j-1)+LPH(j-1))\}} < 1+\alpha \quad \text{equation S5-3-1}$$

where, $1 \leq j < NL-1$

The character height FH and the interval LS between character lines are stored in the RAM. Thus, paragraphs 7-2 and 7-3 can be discriminated in FIG. 7, which will be explained hereinbelow.

In step S5-4 of detecting a blank, blanks corresponding to blank characters are found out in each character line and stored into ROM of memory 5 as BL(i) in the character information storage area 41.

In a character line j, it is calculated by which number of times the length {CPX(i)−(CPX(i−1)+CPW(i−1))} of blanks between a character i-1 and a character i (1≦i<the number of characters on the character line j) is larger than a character pitch PT(j) of the character line. An integer value which is closest to the number of times obtained is stored as BL(i) into the ROM of memory 5. If there is no blank character, 0 is substituted for BL(i) and is stored into the ROM of memory 5. For a first character s on the character line, it is calculated by which integer number of times a difference between the left edge coordinate LX of the document and CPx(s) is larger than the character pitch PT(j) by MPU 4. A result of the calculation is stored as BL(s) into the ROM of memory 5.

In paragraph detecting step S5-5, a delimiter of the paragraph is found out and a predetermined value is stored into the ROM of memory 5 as LF(i) of the delimiter character.

The delimiter of the paragraph is determined by MPU 4 under the following conditions.

(1) A portion in which the interval between character lines is larger than the interval LS between character lines of the body is a turning point of the paragraph.

(2) A character line having a blank in the head portion is the first line of the paragraph.

(3) A character line in which the last character doesn't reach the right edge of the document is the last line of the paragraph.

Practically speaking, the above items (1) to (3) are decided as a boundary of the paragraph in the case where either one of the following conditional equations is satisfied.

With respect to the character line j ($1 \leq j < NL$), the above conditions (1) to (3) are expressed by the following equations.

$$\{LPY(j)-(LPY(j-1)+LPH(j))\}/LS > m \quad (1')$$

$$BL(s) > 0 \quad (2')$$

$$RX-CPX(e) > 2WD(j) \quad (3')$$

s denotes a character number of the first character of the character line j, e indicates a character number of the last character of the character line j-1, and m represents a constant such as 2.

If the equation (2') or (3') is satisfied, 1 is substituted into LF(e). If the equation (1') is satisfied, when a integer value which is closest to the value of $\{LPY(j)-(LPY(j-1)+LPH(j-1))\}/(FH+LS)$ is equal to or larger than 1, a value of (such an integer value+1) is substituted into LF(e). If the integer value is equal to 0, 2 is substituted into LF(e). A processing procedure will be explained in detail with reference to FIGS. 7 and 8.

In character train outputting step S5-6, a desired character train is generated in the designated outputting mode.

As an outputting mode, either one of the mode to discriminate whether blanks in the line are recognized or not, the mode regarding whether a return code is inserted every line end of a document to be recognized or every paragraph thereof, and the mode to insert no return code can be designated by using PD 8 or KBD 9 on the display screen of CRT 1 as shown in FIG. 2.

Figure 6:
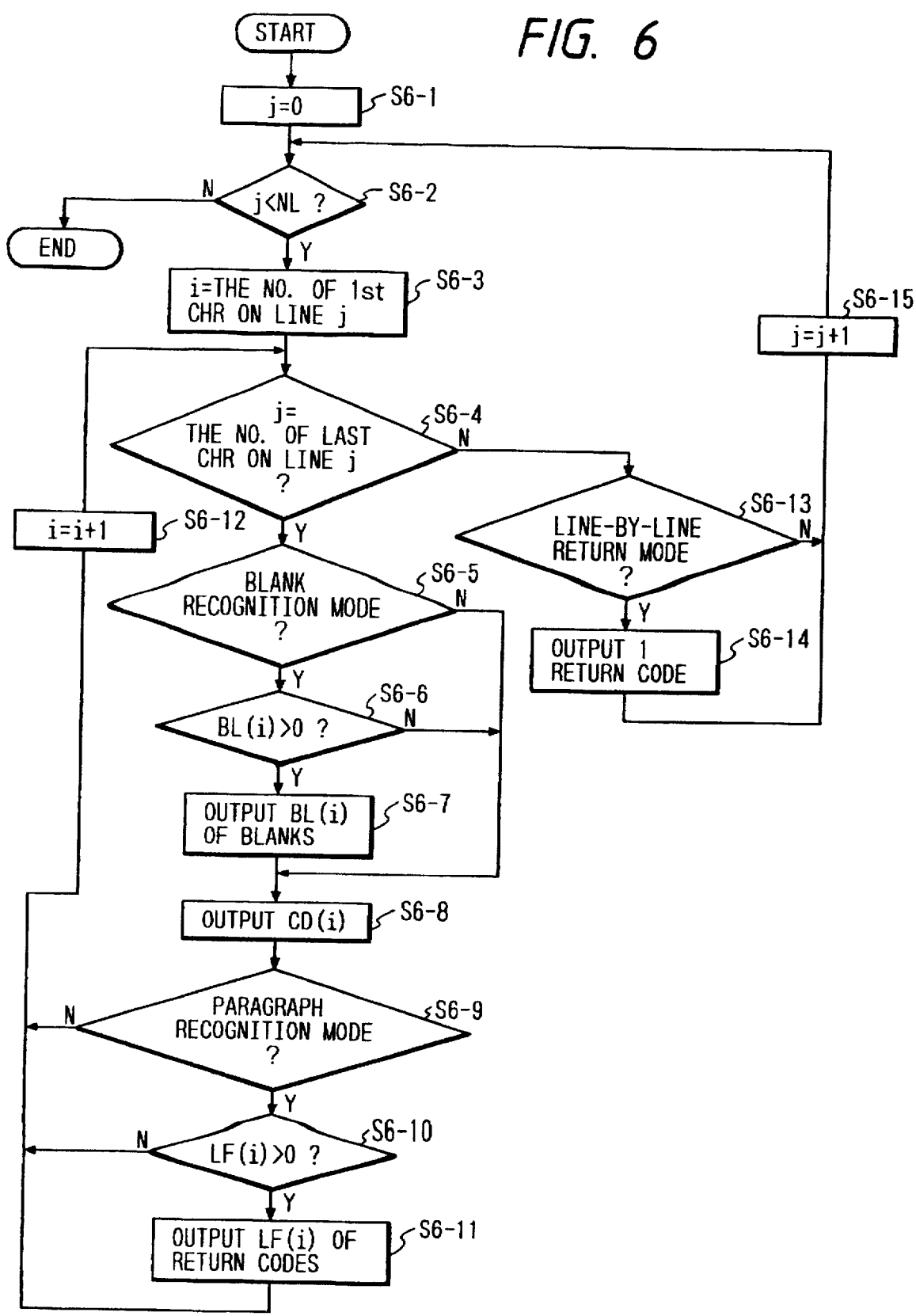
FIG. 6 is a detailed flowchart of a character train output section.

FIG. 6 is a detailed flowchart of the character train outputting section. A program to control the above processes is stored into the ROM 5 and the processes are executed under the control of the MPU 4.

Processes in steps S6-3 to S6-14 are performed for NL character lines from the 0th line to the (NL−1)th line. In step S6-3, the character number of the first character of the character line j is substituted for i. The first character of the character line can be known from LS(j) of the character line information storage area. Processes in steps S6-5 to S6-12 are performed with respect to each character included in the character line j. A discrimination regarding whether the character is the last character of the character line or not is performed by branching the condition in step S6-4. First, if the outputting mode has been set to the mode to recognize the blanks in the line (step S6-5) and if there are spaces as many as the blank characters before the character i (step S6-6), the BL(i) blank characters are generated onto the CRT 1 in step S6-7. If NO in steps S6-5 and S6-6, nothing is generated and the processing routine advances to step S6-8. In step S6-8, the character code CD(i) as a result recognized by the recognizer is supplied to the display controller 3. After that, if the outputting mode has been set to the mode to recognize the return code at the end of the paragraph (step S6-9) and if the return code should be inserted (step S6-10), LF(i) return codes are supplied to the display controller 3 in step S6-11. After completion of the processes for all of the characters of the character line j, a check is made in step S6-13 to see if the outputting mode has been set to the mode to return every line end or not. If YES, one return code is unconditionally generated to the display controller 3 in step S6-14. If it is determined that the processes for all of the character lines have been executed in step S6-2, the above processing routine is finished.

In the embodiment, all of the processes in steps S5-1 to S5-5 have been executed irrespective of the kind of outputting mode. However, some of the processes can be also skipped in accordance with the outputting mode. For instance, in the case of the mode in which there is no need to recognize the paragraph, it is unnecessary to perform the processes in steps S5-2 and S5-3. In the case of the mode in which there is no need to recognize both of the paragraph and the blanks in the line, the processes in steps S5-1 to S5-5 are unnecessary. By adding such a skipping control, the processing speed can be improved.

Paragraph detecting step S5-5 in FIG. 5 will now be described in detail. In this step, a delimiter of the paragraph is found out and a predetermined value is stored into LF(i) of the character corresponding to the delimiter.

The delimiter of the paragraph is determined by the following conditions.

(1) A portion in which the interval between character lines is larger than the interval LS between character lines of the sentence is a turning point of the paragraph.

(2) A character line having a blank in the head portion is a first line of the paragraph.

(3) A character line in which the last character doesn't reach the right edge of the document is a last line of the paragraph.

FIG. 7 is a schematic diagram of the input document.

In an example of the document of FIG. 7, a character line 7-1 corresponds to a head portion, reference numeral 7-2 denotes a sentence, and reference numeral 7-3 corresponds to, for instance, an itemized portion. The paragraph detecting section intends to detect the character line 7-1, character lines 7-4 to 7-5, character lines 7-6 to 7-7, and character lines 7-8 to 7-9 by using a character line 7-10 as a paragraph. Since the character line 7-8 has characters until the right edge, the characters continue until the character line 7-9.

Figure 8:
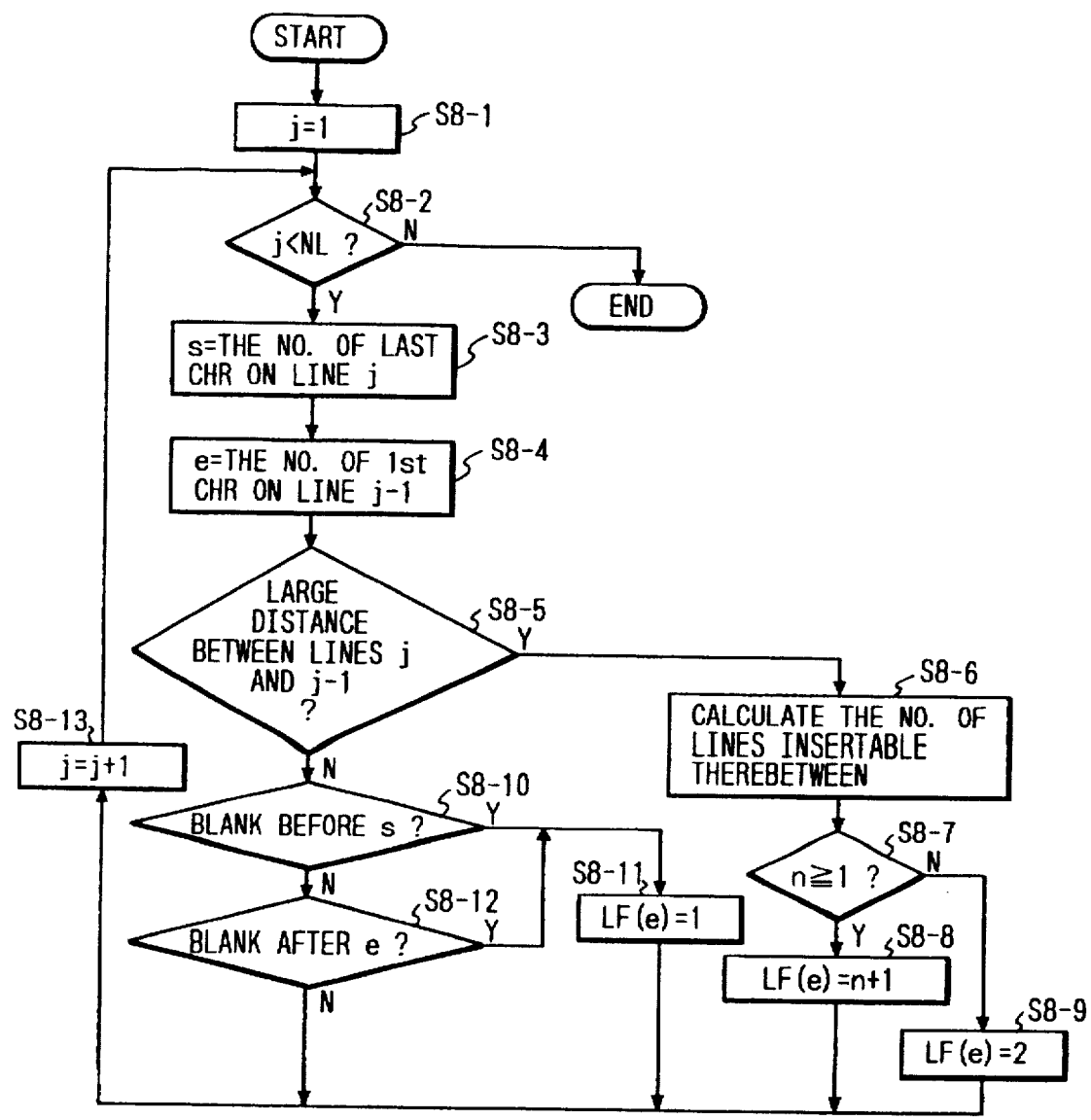
FIG. 8 is a flowchart of a paragraph detection.

FIG. 8 is a detailed flowchart of the paragraph detecting section. A program to control the processes is stored into the ROM of memory 5 and the processes are executed under the control of MPU 4.

The processes are sequentially started from the character line of the character line No. 1 for the NL character lines of the character Nos. 1 to NL (step S8-1). Processes in steps S8-3 to S8-12 are executed for each character line j. First, the character No. of the first character S of the character line j is stored into a register s provided in MPU 4 or main memory 5 in FIG. 1. Registers to store the information of the other characters are also properly provided in MPU 4 or main memory 5 in FIG. 1 and are used as one storage memory on the program. The area of the register s is held in the RAM of memory 5. The character No. of the first character can be obtained from LS(j) in the character line information storage area 42. Similarly, the character No. of the last character e of the character line j-1 before the character line j is stored into the register e. An area of the character e is held in the RAM of memory 5. The character No. of the last character e of the preceding character line can be easily obtained because such a character is located just before the character indicated by LS(j) in character line information storage area 42. In step S8-5, if an interval between the character line j-1 and the character line j is larger than the interval LS between the character lines of the body portion, it is determined that there is a different paragraph between the character lines j and j-1, so that the processing routine advances to step S8-6.

The discrimination in step S8-5 is practically executed as follows.

$$(LPY(j)-(LPY(j-1)+LPH(j-1)))/LS > m \qquad \text{equation S8-5-1}$$

where, m is a constant such as 2.

In step S8-6, the number of blank lines which are insertable therebetween is calculated and a calculated value is stored into a register n. A value of n is practically expressed by the following equation.

$$n\ (LPY(j)-(LPY(j-1)+LPH(j-1)+LPH(j-1)))/(FH+LS) \qquad \text{equation S8-6-1}$$

When n is 1 or more, the value of (n+1) is stored into LF(e) in steps S8-7 and S8-8. If n is smaller than 1, 2 is stored into LF(e). The value in LF(e) is equal to the number of return codes when the return codes are generated after that. In step S8-10, a check is made to see if there is a blank before the first character S of the character line j or not. Practically speaking, such a discrimination is performed by checking whether BL(s) in character information storage area 41 is larger than 0 or not. If it is determined that a blank exists before the first character S, step S8-11 follows and 1 is stored into LF(e).

In step S8-12, a check is made to see if there is a blank after the last character e of the character line j-1 or not. The blank is discriminated by a distance between the position of the last character e and the right edge of the document. Practically speaking, such a blank is discriminated as follows.

$$RX-CPX(e) > 2WD(j-1) \qquad \text{equations S8-12-1}$$

Thus, it is possible to recognize such that the character lines 7-5, 7-9, and 7-10 in FIG. 7 are the ends of the paragraphs.

By executing the above processes with respect to the character lines of the Nos. j (=1) to NL-1, the processing routine is finished. Thus, the delimiter of the paragraph can be recognized because a character in which a value larger than 0 has been stored is a last character of the paragraph by referring to the value in LF(i) of each character.

What is claimed is:

1. An image processing apparatus comprising:
   input means for inputting image data;
   cut-out means for cutting out a plurality of character position information from the image data inputted by said input means;
   detection means for detecting a plurality of spaces between adjacent ones of the plurality of character position information cut out by said cut-out means;
   derivation means for deriving a mean space value from the plurality of spaces detected by said detection means;
   discrimination means for discriminating whether each of the plurality of spaces detected by said detection means is larger than a predetermined threshold;
   obtaining means for obtaining a number of space codes to be assigned to one of the plurality of spaces detected by said detection means by dividing a size of the one space by the mean space value derived by said derivation means, in a case that said discrimination means discriminates that the one space is larger than the predetermined threshold; and
   output means for outputting a number of space codes equal to the number obtained by said obtaining means.

2. An apparatus according to claim 1, further comprising designating means for designating whether a detection by said detecting means is to be executed or not.

3. An apparatus according to claim 2, wherein in a case where it has been designated by said designating means that detection is to be executed, spaces are detected and information indicative of spaces are generated.

4. An apparatus according to claim 1, wherein the detection is executed at a beginning of a line of image information.

5. An apparatus according to claim 1, wherein said output means outputs the number of space codes in a case that a mode designating output of space codes is selected.

6. An apparatus according to claim 1, wherein said input means comprises a scanner.

7. An apparatus according to claim 1, wherein the predetermined threshold is twice as large as the mean space value derived by said derivation means.

8. An apparatus according to claim 1, wherein the space codes comprise blank character codes.

9. An apparatus according to claim 1, wherein the space codes comprise return codes.

10. An image processing method comprising the steps of:
    inputting image data;
    cutting out a plurality of character position information from the image data inputted in said inputting step;
    detecting a plurality of spaces between adjacent ones of the plurality of character position information cut out in said cutting out step;
    deriving a mean space value from the plurality of spaces detected in said detecting step;
    discriminating whether each of the plurality of spaces detected in said detecting step is larger than a predetermined threshold;
    obtaining a number of space codes to be assigned to one of the plurality of spaces detected in said detecting step by dividing a size of the one space by the mean space value derived in said deriving step, in a case that the one space is larger than the predetermined threshold; and
    outputting a number of space codes equal to the number obtained in said obtaining step.

11. A method according to claim 10, further comprising the step of designating whether a detection in said detecting step is to be executed or not.

12. A method according to claim 11, wherein in a case where it has been designated in said designating step that detection is to be executed, spaces are detected and information indicative of spaces are generated.

13. A method according to claim 10, wherein the detection is executed at a beginning of a line of image information.

14. A method according to claim 10, wherein said outputting step outputs the number of space codes in a case that a mode designating output of space codes is selected.

15. A method according to claim 10, wherein said inputting step comprises scanning image data using a scanner.

16. A method according to claim 10, wherein the predetermined threshold is twice as large as the mean space value derived in said deriving step.

17. A method according to claim 10, wherein the space codes comprise blank character codes.

18. A method according to claim 10, wherein the space codes comprise return codes.

* * * * *

UNITED STATES PATENT AND TRADEMARK OFFICE
CERTIFICATE OF CORRECTION

PATENT NO. : 5,754,685
DATED : May 19, 1998
INVENTOR(S) : KINYA TAKAHASHI, et al.

It is certified that error appears in the above-identified patent and that said Letters Patent is hereby corrected as shown below:

TITLE PAGE, ITEM [56], REFERENCES CITED

FOREIGN PATENT DOCUMENTS:

"1302483 12/1989 Japan" should read:
--1-302483 12/1989 Japan--.

Signed and Sealed this

Sixteenth Day of March, 1999

Attest:

Attesting Officer

Q. TODD DICKINSON

Acting Commissioner of Patents and Trademarks